United States Patent
Zhang et al.

(10) Patent No.: US 11,662,592 B2
(45) Date of Patent: May 30, 2023

(54) HEAD-MOUNTED DISPLAY DEVICE AND HEAD-MOUNTED DISPLAY SYSTEM

(71) Applicant: QINGDAO PICO TECHNOLOGY CO., LTD., Shandong (CN)

(72) Inventors: Xiuzhi Zhang, Shandong (CN); Hongwei Zhou, Shandong (CN); Guanghui Liu, Shandong (CN); Hengjiang Guo, Shandong (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/817,643

(22) Filed: Aug. 4, 2022

(65) Prior Publication Data

US 2022/0373808 A1 Nov. 24, 2022

Related U.S. Application Data

(63) Continuation of application No. PCT/CN2021/118547, filed on Sep. 15, 2021.

(51) Int. Cl.
*G02B 27/00* (2006.01)
*G02B 27/01* (2006.01)

(52) U.S. Cl.
CPC ..... *G02B 27/0172* (2013.01); *G02B 27/0093* (2013.01); *G02B 2027/014* (2013.01);
(Continued)

(58) Field of Classification Search
CPC .... G02B 2027/0093; G02B 2027/0138; G02B 2027/014; G02B 2027/0172; G02B 2027/0187
See application file for complete search history.

(56) References Cited

U.S. PATENT DOCUMENTS

2015/0138065 A1   5/2015   Alfieri
2017/0330496 A1   11/2017  Oravainen
(Continued)

FOREIGN PATENT DOCUMENTS

CN   106527687 A   3/2017
CN   206541288 U   10/2017
(Continued)

OTHER PUBLICATIONS

First Office Action dated Jan. 26, 2022 in Chinese Application No. 202110536680.9, with English translation (16 pages).
(Continued)

*Primary Examiner* — Ryan A Lubit (57) ABSTRACT

Provided are a head-mounted display device and a head-mounted display system. The head-mounted display device includes: a processor, a first interface, a transfer switch, a wireless communication module and a display screen, the wireless communication module is configured to be in wireless communication connection with a hand-held controller; the processor is configured to control the transfer switch to switch for communication between the first interface and the display screen when detecting that the first interface is connected to a host, and send first position data and second position data to the host via the first interface, so as to allow the host to render an image according to the first position data and the second position data and to output and display a rendered image on the display screen via the first interface.

18 Claims, 3 Drawing Sheets

(52) U.S. Cl.
CPC ............ *G02B 2027/0138* (2013.01); *G02B 2027/0187* (2013.01)

(56) References Cited

U.S. PATENT DOCUMENTS

| | | | |
|---|---|---|---|
| 2018/0173320 A1* | 6/2018 | Bristol | G06F 3/0304 |
| 2018/0197501 A1* | 7/2018 | Veeramani | H04N 21/43635 |
| 2020/0058256 A1* | 2/2020 | Seibert | G06F 3/017 |
| 2020/0341563 A1* | 10/2020 | Poore | G06K 9/6289 |
| 2020/0386998 A1* | 12/2020 | Kang | A63F 13/22 |
| 2021/0124180 A1* | 4/2021 | Amadio | G06K 7/10881 |
| 2021/0185294 A1* | 6/2021 | Malaika | G06F 3/0346 |
| 2021/0256769 A1* | 8/2021 | Bailey | G06T 19/006 |
| 2021/0330185 A1* | 10/2021 | Krukowski | A61B 3/113 |
| 2022/0026711 A1* | 1/2022 | Padula | G02B 27/0101 |

FOREIGN PATENT DOCUMENTS

| | | |
|---|---|---|
| CN | 207460366 U | 6/2018 |
| CN | 109375764 A | 2/2019 |
| CN | 209028563 U | 6/2019 |
| CN | 209858860 U | 12/2019 |
| CN | 111142951 A | 5/2020 |
| CN | 112286343 A | 1/2021 |
| CN | 113382230 A | 9/2021 |

OTHER PUBLICATIONS

Third Office Action dated Sep. 29, 2022 in Chinese Application No. 202110536680.9, with English translation (16 pages).

* cited by examiner

HEAD-MOUNTED DISPLAY DEVICE AND HEAD-MOUNTED DISPLAY SYSTEM

CROSS-REFERENCE TO RELATED APPLICATION

The present disclosure is a continuation of PCT/CN2021/118547 filed Sep. 15, 2021 which claims the priority of CN202110536680.9, applied on May 17, 2021 and entitled "Head-mounted display device and head-mounted display system", which is incorporated in its entirety herein by reference.

TECHNICAL FIELD

The present disclosure relates to the technical field of virtual reality display, and in particular to a head-mounted display device and a head-mounted display system.

BACKGROUND

A head-mounted display device includes a head-mounted virtual reality display device. A virtual reality display technology generates a virtual world with a three-dimensional space through simulation and provides users with visual, auditory or tactual simulation, through which the users can observe affairs in the three-dimensional space timely without restriction as if they were there.

An existing head-mounted virtual reality display device has two types: a personal computer (PC) helmet and an all-in-one machine. The PC helmet has more mature and stable content resources, but more complicated usage scenarios, higher difficulty in environment setup, and inconvenience in carrying and use. The all-in-one machine is convenient to use and carry but has less game resources. So most existing all-in-one machines can achieve wireless streaming through 5G WIFI, 11ad, etc. However, the wireless streaming is obviously influenced by load of a router or others, which affects delay, and a wireless bandwidth problem will also lead to low definition, which affects an experience.

SUMMARY

The embodiments of the present disclosure provide a new technical solution of a head-mounted display device.

According to a first aspect of the embodiments of the present disclosure, there is provided a head-mounted display device. The device includes: a processor, a first interface, a transfer switch, a wireless communication module and a display screen.

The wireless communication module is configured to be in wireless communication connection with a hand-held controller.

The processor is configured to acquire first position data of the head-mounted display device and second position data of the hand-held controller.

The processor is configured to control the transfer switch to switch for communication between the first interface and the display screen when detecting that the first interface is connected to a host, and is configured to send the first position data and the second position data to the host via the first interface, so as to allow the host to render an image according to the first position data and the second position data and to output and display a rendered image on the display screen via the first interface; or the processor is configured to control the transfer switch to switch for communication between the processor and the display screen when detecting that the first interface is not connected to the host, and is configured to render the image according to the first position data and the second position data and output and display a rendered image on the display screen.

In an exemplary embodiment, the head-mounted display device further includes a camera and a first inertial measurement module. The hand-held controller includes a second inertial measurement module and a plurality of illumination sources.

The camera device is configured to collect a first image in first exposure time and collect a second image in second exposure time, the second image at least including light spots corresponding to the plurality of illumination sources arranged on the hand-held controller.

The first inertial measurement module is configured to collect posture information of the head-mounted display device.

The second inertial measurement module is configured to collect posture information of the hand-held controller.

The processor is configured to determine the first position data according to the first image and the posture information of the head-mounted display device, and is configured to determine the second position data according to the second image, the posture information of the hand-held controller and the first position data.

In an exemplary embodiment, the processor is configured to receive audio data transmitted by the host via the first interface and decode the audio data when detecting that the first interface is connected to the host.

The audio output module is configured to play decoded audio data.

In an exemplary embodiment, the camera device includes at least one fisheye camera.

In an exemplary embodiment, the head-mounted display device further includes a bridge chip and a display driving module. The display driving module is connected between the processor and the transfer switch. The bridge chip is connected between the first interface and the transfer switch.

The bridge chip is configured to convert a received image rendered by the host and output and display the image on the display screen; or the display driving module is configured to drive the display screen to display an image rendered by the processor.

In an exemplary embodiment, the head-mounted display device further includes a lens module. The lens module includes a left lens and a right lens.

In an exemplary embodiment, the display screen includes a left display screen and a right display screen. The left display screen moves with movement of the left lens, and the right display screen moves with movement of the right lens.

In an exemplary embodiment, the head-mounted display device further includes an interpupillary distance measurement module.

The interpupillary distance measurement module is configured to measure a distance between the left lens and the right lens.

The processor is configured to adjust, a display central position of an image displayed on the display screen according to the distance between the left lens and the right lens when a central position of the lens module is aligned with a human eye central position of a wearer of the head-mounted display device.

In an exemplary embodiment, the head-mounted display device further includes a second interface.

The second interface is configured to connect a power supply device to allow the power supply device to supply power to the head-mounted display device.

According to a second aspect of the embodiments of the present disclosure, there is further provided a head-mounted display system. The system includes:

the head-mounted display device according to the first aspect;

a hand-held controller, the hand-held controller being in wireless communication connection with the head-mounted display device via a wireless communication module of the head-mounted display device; and a host, the host being in wire communication connection with the head-mounted display device via a first interface of the head-mounted display device.

According to the embodiments of the present disclosure, there is provided a new head-mounted display device. The head-mounted display device is provided with the processor, the transfer switch, the display screen and the first interface, where the processor is capable of acquiring the first position data of the head-mounted display device and the second position data of the hand-held controller, controlling the transfer switch to switch for communication between the first interface and the display screen when detecting that the first interface is connected to the host, and sending the first position data and the second position data to the host via the first interface, so as to allow the host to render the image according to the first position data and the second position data, or the processor is capable of controlling the transfer switch to switch for communication between the processor and the display screen when detecting that the first interface is not connected to the host, and rendering the image according to the first position data and the second position data. The head-mounted display device is capable of achieving a switching functional module of an all-in-one machine and a personal computer (PC) helmet, thus automatically completing switching of the all-in-one machine and the PC helmet, and may use a head and hand tracking function of the all-in-one machine.

BRIEF DESCRIPTION OF THE DRAWINGS

The accompanying drawings incorporated in the specification as a constituent part of the specification illustrate the embodiments of the present disclosure and are used to explain the principles of the present disclosure together with the specification.

DETAILED DESCRIPTION OF THE EMBODIMENTS

Various exemplary embodiments of the present disclosure will be described in detail with reference to the accompanying drawings. It should be noted that the relative arrangement, numerical expressions and numerical values of components and steps described in these embodiments do not limit the scope of the present disclosure unless otherwise specified.

The following description of at least one exemplary embodiment is merely illustrative in nature and in no way serves as any limitation of the present disclosure and its application or uses.

Technologies, methods and devices known to those of ordinary skill in related fields may not be discussed in detail, but in appropriate cases, they should be regarded as part of the specification.

In all the examples shown and discussed herein, any specific value should be interpreted as exemplary only, not as a limitation. Therefore, other examples of exemplary embodiments may have different values.

It should be noted that like numerals and letters denote like items in the following accompanying drawings, and therefore, once an item is defined in one accompanying drawing, it need not be further discussed in the subsequent accompanying drawings.

Figure 1:
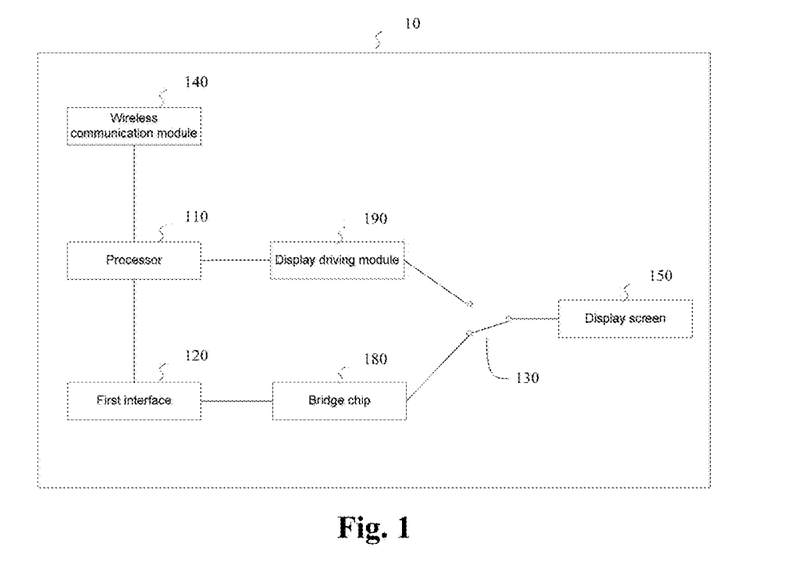
FIG. 1 is a functional block diagram of a head-mounted display device according to the embodiments of the present disclosure.

The embodiments of the present disclosure provide a head-mounted display device. The head-mounted display device may be a head-mounted virtual reality display device. FIG. 1 is a functional block diagram of the head-mounted display device according to the embodiments of the present disclosure.

With reference to FIG. 1, the head-mounted display device 10 includes a processor 110, a first interface 120, a transfer switch 130, a wireless communication module 140 and a display screen 150. The wireless communication module 140 is configured to be in wireless communication connection with a hand-held controller 20. The first interface 120 may be a Type C interface. Image data, audio data and position data may be transmitted via the first interface 120. The processor 110 may be connected to the first interface 120 and the wireless communication module 140 separately. The transfer switch 130 includes a movable contact and two static contacts, where one of the static contacts is connected to the first interface 120, the other static contact is connected to the processor 110, and the movable contact is connected to the display screen 150. The display screen 150 may be a liquid crystal display (LCD) screen.

The processor 110 is configured to acquire first position data of the head-mounted display device 10 and second position data of the hand-held controller 20. The position data generally includes position data and posture data, and the position data may also called 6 Degree of Freedom (6DoF) data. For example, the first position data includes position data and posture data of the head-mounted display device 10, and the second position data includes position data and posture data of the hand-held controller 20. The head-mounted display device 10 may achieve a head and hand tracking function of a wearer of the head-mounted display device 10.

Figure 2A:
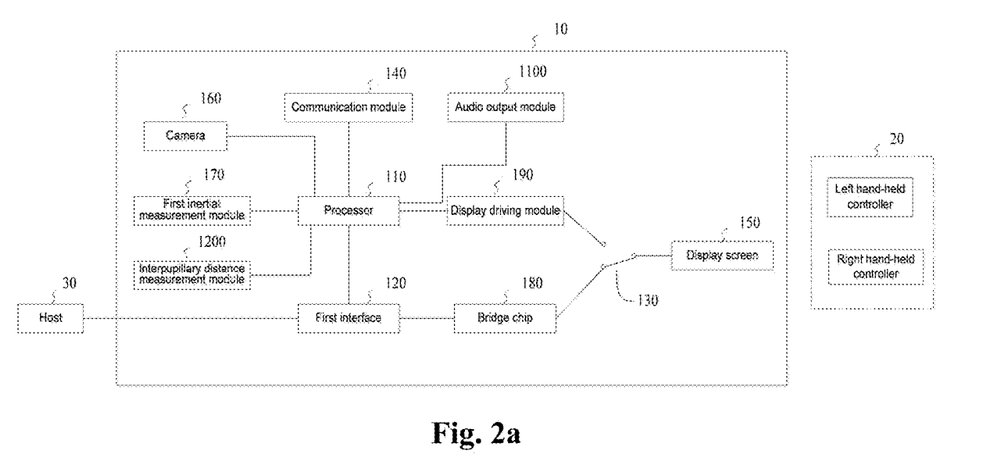
FIG. 2a is a functional block diagram of a head-mounted display system according to the embodiments of the present disclosure.
Figure 2B:
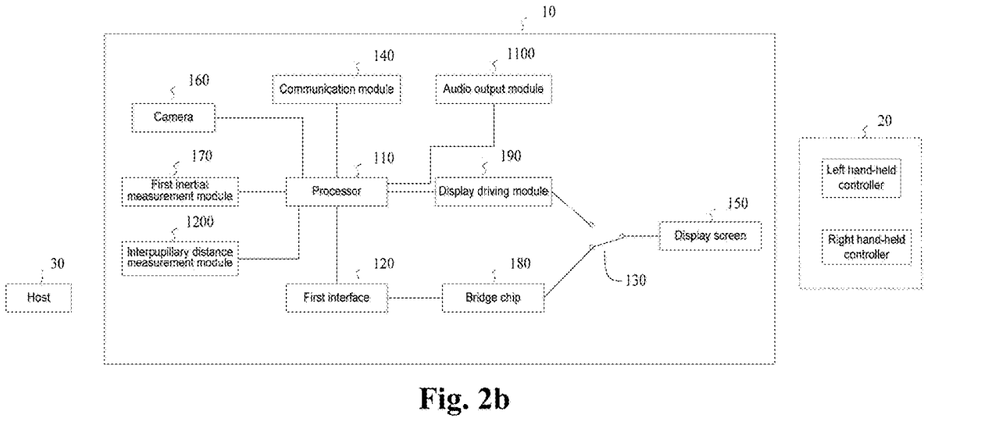
FIG. 2b is a functional block diagram of a head-mounted display system according to another embodiment of the present disclosure.

In the embodiment, as shown in FIG. 2a and FIG. 2b, the head-mounted display device 10 further includes a camera 160 and a first inertial measurement module 170. The hand-held controller 20 includes a second inertial measurement module and a plurality of illumination sources (not shown in the figures).

The camera device 160 is configured to collect a first image in first exposure time and collect a second image in second exposure time, the second image at least including light spots corresponding to the plurality of illumination sources arranged on the hand-held controller 20. The first inertial measurement module 170 is configured to collect posture information of the head-mounted display device 10. The second inertial measurement module is configured to collect posture information of the hand-held controller 20. The processor 110 is configured to determine the first position data according to the first image and the posture information of the head-mounted display device 10, and is configured to determine the second position data according to the second image, the posture information of the hand-held controller and the first position data.

In the embodiment, the camera device 160 includes at least one fisheye camera 161. The at least one fisheye camera 161 is configured to collect an image. The at least one fisheye camera 161 is configured to alternately collect the first image and the second image in different exposure time. For example, the first image is collected in the first exposure time, and then the second image is collected in the second exposure time. The at least one fisheye camera 161 collects the first image or the second image at the same time, that is, a central point of exposure time of each fisheye camera 161 is consistent.

Figure 3:
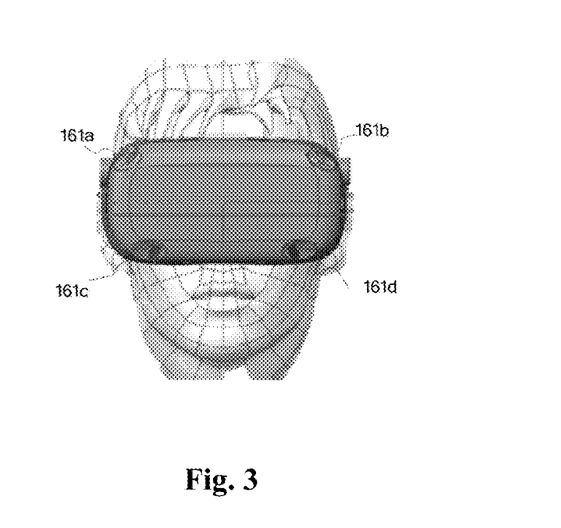
FIG. 3 is a configuration block diagram of a camera according to the present disclosure.

For example, as shown in FIG. 3, an outer surface of the head-mounted display device 10 is provided with four fisheye cameras 161, which specifically include an upper left fisheye camera 161*a*, an upper right fisheye camera 161*b*, a lower left fisheye camera 161*c* and a lower right fisheye camera 161*d*. The four fisheye cameras 161 are arranged at different positions. The fisheye cameras 161 may be introduced by referring to the following embodiments, which will not be repeated herein.

Each fisheye camera 161 is mounted at a different position, so that an external environment sensed by the fisheye camera may also be different. In order to guarantee consistency of output of each first image in different environments, the four fisheye cameras 161 may collect the first image in different first exposure time separately. For example, first exposure time of the fisheye camera 161 in a dark environment is set to be long, and first exposure time of the fisheye camera 161 in a desirable environment is set to be short, so that exposure central points are aligned, thus guaranteeing the four fisheye cameras 161 collect the first image at the same time and the four fisheye cameras 161 are capable of photographing ambient environments at the same time and guaranteeing tracking precision.

The hand-held controller 20 is provided with the plurality of illumination sources, so the plurality of illumination sources is not located at the same plane. The luminous element may be, for example, a visible light source or an infrared light source, such as a light-emitting diode (LED) light. A light source of the hand-held controller 20 is brighter than an external environment. In order to effectively reduce influence of the external environment on tracking of the hand-held controller 20, second exposure time of the four fisheye cameras 161 is set to be short, the four fisheye cameras 161 use consistent second exposure time, and when the hand-held controller 20 is at an exposure moment, the light source of the hand-held controller is luminous, so that the four fisheye cameras may the second image of the hand-held controller 20 at the same time. For example, when the second image is collected by the at least one fisheye camera 161 arranged on the head-mounted display device 10 in the second exposure time, the illumination sources on the hand-held controller 20 are controlled to light up according to preset lighting time, and a middle moment of the second exposure time corresponds to a middle moment of the lighting time.

The middle moment of the second exposure time and the middle moment of the lighting time are synchronized, that is, the illumination sources on the hand-held controller 20 are controlled to light up within an exposure time period when the at least one fisheye camera 161 collects the second image, thus guaranteeing that the second image includes the light spots corresponding to the plurality of illumination sources arranged on the hand-held controller 20.

In the embodiment, the lighting time may be longer than the second exposure time, that is, luminous time of the illumination sources is started before a start of exposure time and ended after an end of the exposure time, which may avoid a precision error caused by synchronously controlling the camera device 160 to collect the second image and lighting of the illumination sources of the hand-held controller 20 through wireless communication, thus guaranteeing that the camera device 160 may capture the light spots generated by the illumination sources when collecting the second image.

The processor 110 may process, after acquiring the first position data of the head-mounted display device 10 and the second position data of the hand-held controller 20, the first position data and the second position data in different cases according to a working mode of the head-mounted display device 10.

In a first case: the processor 110 may control the transfer switch 130 to switch for communication between the first interface 120 and the display screen 150 when detecting that the first interface 120 is connected to a host 30, and may send the first position data and the second position data to the host 30 via the first interface 120, so as to allow the host 30 to render an image according to the first position data and the second position data and output and display a rendered image on the display screen 150 via the first interface 130.

In the embodiment, when the host 30 is connected to the first interface 120 by means of a personal computer (PC) data line, the processor 110 may control one of the static contacts of the transfer switch 130 to be connected to the movable contact, so as to achieve communication between the first interface 120 and the display screen 150, and in this case, the head-mounted display device 10 works in a PC helmet mode.

In the embodiment, the head-mounted display device 10 further includes a bridge chip 180, the bridge chip 180 is connected between the first interface 120 and the transfer switch 130, and the bridge chip 180 is configured to convert a received image rendered by the host 30 and output and display the image on the display screen 150.

As shown in FIG. 2*a*, the first interface 120 may have an image terminal and a data terminal. The data terminal is a universal serial bus (USB) terminal, through which the position data and the audio data may be transmitted. The image terminal is a DisplayPort (DP) terminal, through which the image data may be transmitted. The image terminal is connected to the bridge chip 180. The data terminal is connected to the processor 110. When the host 30 is connected to the first interface 120 by means of the PC data line, the processor 110 may control one of the static contacts of the transfer switch 130 to be connected to the movable contact to achieve communication between the first interface 120, the bridge chip 180 and the display screen 150, the processor 110 transmits the position data of the head-mounted display device 10 to the host 30 by means of the data terminal, the host 30 renders the image according to the position data of the head-mounted display device 10 and the position data of the hand-held controller 20, so as to obtain a DP signal and transmit the DP signal to the bridge chip 180 by means of the image terminal of the first interface 120, and the bridge chip 180 converts the DP signal into a mobile industry processor interface (MIPI) signal and outputs and displays the MIPI signal on the display screen 150.

Further, the processor 110 may receive the audio data transmitted by the host 30 by means of the data terminal of the first interface 120 and decodes the audio data. An audio output module 1100 plays the decoded audio data.

In a second case: the processor 110 is configured to control the transfer switch 130 to switch for communication between the processor 110 and the display screen 150 when detecting that the first interface 120 is not connected to the host 30, and is configured to render the image according to the first position data and the second position data and output and display a rendered image on the display screen 150.

In the embodiment, when the host 30 is not connected to the first interface 120, the processor 110 may control the other static contact of the transfer switch 130 to be connected to the movable contact, so as to achieve communication between the processor 110 and the display screen 150, and in this case, the head-mounted display device 10 works in an all-in-one machine mode.

In the embodiment, the head-mounted display device 10 further includes a display driving module 190. The display driving module 190 is connected between the processor 110 and the transfer switch 130. The display driving module 190 is configured to drive the display screen 150 to display an image rendered by the processor 110.

For example, as shown in FIG. 2b, when the host 30 is not connected to the first interface 120, the processor 110 may control the other static contact of the transfer switch 130 to be connected to the movable contact to achieve communication between the processor 120, the display driving module 190 and the display screen 150, and the processor 110 renders the image according to the position data of the head-mounted display device 10 and the position data of the hand-held controller 20, and controls the display driving module 190 to drive the display screen 150 to display the image rendered by the processor 110.

According to the embodiments of the present disclosure, there is provided a new head-mounted display device. The head-mounted display device is provided with the processor, the transfer switch, the display screen and the first interface, where the processor is capable of acquiring the first position data of the head-mounted display device and the second position data of the hand-held controller, controlling the transfer switch to switch for communication between the first interface and the display screen when detecting that the first interface is connected to the host, and sending the first position data and the second position data to the host via the first interface, so as to allow the host to render the image according to the first position data and the second position data, or the processor is capable of controlling the transfer switch to switch for communication between the processor and the display screen when detecting that the first interface is not connected to the host, and rendering the image according to the first position data and the second position data. The head-mounted display device is capable of achieving a switching functional module of an all-in-one machine and a PC helmet, thus automatically completing switching of the all-in-one machine and the PC helmet, and may use the head and hand tracking function of the all-in-one machine.

In an embodiment, the camera device 160 includes the at least one fisheye camera 161, for example, the four fisheye cameras including the fisheye camera 161a, the fisheye camera 161b, the fisheye camera 161c and the fisheye camera 161d are shown in FIG. 3. The embodiment will briefly introduce the at least one fisheye camera 161 herein.

The at least one fisheye camera 161 may have consistent horizontal, vertical and diagonal fields of view. Any fisheye camera 161 has a certain concave shape to prevent the head-mounted display device 10 from falling and to protect a lens module when the head-mounted display device 10 is placed on a horizontal flat face such as a desktop.

The at least one fisheye camera 161 is placed at a plurality of positions of a surface of the head-mounted display device 10, so that a tracking range of the head-mounted display device 10 is increased, and when the head-mounted display device 10 performs tracking, an ambient environment may be tracked in a wide range, which may improve tracking stability and precision, and may improve a tracking range of the hand-held controller 20, reduce a blind area of optical hand-held controller tracking, and obtain a better hand-held controller tracking experience.

In a tracking diagram of each fisheye camera 161, a covering area of each fisheye camera 161 is output according to data of a field of view of each fisheye camera 161.

Each fisheye camera 161 may output an own range of the field of view according to different colors. For example, in a main visible range of human eyes, ranges of a plurality of fisheye cameras may be kept overlapping to improve the tracking precision and stability, and an overlapping area of the plurality of fisheye cameras 161 may guarantee better tracking precision and stability. Specifically, at the lower left fisheye camera 161c and the lower right fisheye camera 161d, an overlapping area of the fisheye cameras 161 may be increased to improve the precision and stability of a visible area; or, for example, in an areas that the human eyes cannot focus on, such as the upper left fisheye camera 161a and the upper right fisheye camera 161b, a tracking area of the single fisheye camera 161 is increased to increase a tracking range.

In an embodiment, the head-mounted display device 10 further includes a lens module (not shown in the figure). The lens module includes a left lens and a right lens.

In an embodiment, the display screen 150 includes a left display screen and a right display screen. The left display screen moves with movement of the left lens, and the right display screen moves with movement of the right lens.

In the embodiment, the head-mounted display device 10 has the left display screen and the right display screen, that is, the head-mounted display device 10 has double display screens. The display screen moves along with the corresponding lens. For example, when a wearer of the head-mounted display device 10 moves the left lens, the left display screen moves accordingly, and for example, when the wearer of the head-mounted display device 10 moves the right lens, the right display screen moves accordingly. Therefore, once a central position of the lens module, a central position of the display screen and a human eye central position of the wearer of the head-mounted display device 10 are aligned, the head-mounted display device may be used.

In an embodiment, the display screen 150 only includes a display screen, and the head-mounted display device 10 further includes an interpupillary distance measurement module 1200.

The interpupillary distance measurement module 1200 is configured to measure a distance between the left lens and the right lens. The interpupillary distance measurement module 1200 may be a slide rheostat, a hall sensor, etc.

The processor 110 is configured to adjust, a display central position of an image displayed on the display screen 150 according to the distance between the left lens and the right lens when the central position of the lens module is aligned with the human eye central position of the wearer of the head-mounted display device 10.

In the embodiment, the display screen 150 cannot move along with the left lens or the right lens. When the wearer of the head-mounted display device 10 moves the left lens or the right lens, the interpupillary distance measurement module 1200 is capable of measuring the distance between the left lens and the right lens in real time. When the wearer of the head-mounted display device 10 moves the left lens or the right lens so as to basically align the central position of the lens module with the human eye central position of the wearer, the processor 110 may adjust the display central position of the image displayed on the display screen 150 according to a current distance, between the left lens and the right lens, measured by the interpupillary distance measurement module 1200.

In an embodiment, the head-mounted display device 10 may further include a second interface (not shown in the figure). The second interface is configured to connect a power supply device to allow the power supply device to supply power to the head-mounted display device 10. The second interface may be a USB 3.0 interface.

It may be understood that the head-mounted display device 10 may further include a distance sensor measurement module, a memory storage module, a wireless fidelity (WIFI)/british telecom (BT) module, a power management module, an audio input module, an optical display module, etc.

Figure 4A:
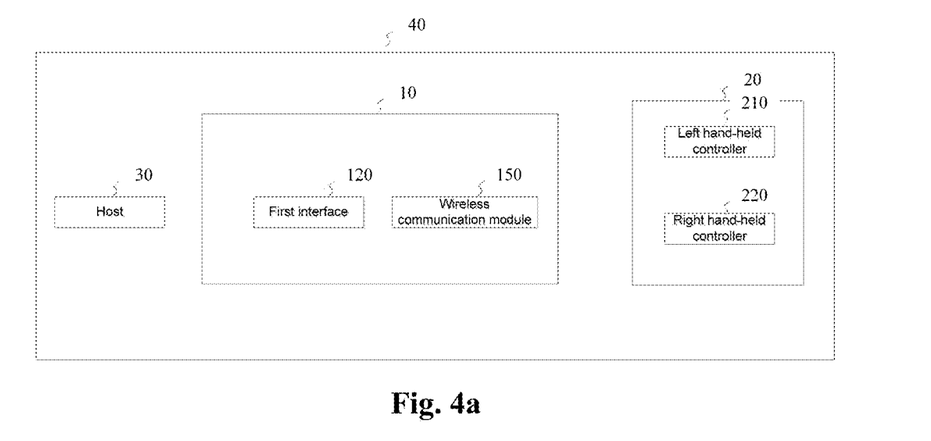
FIG. 4a is a functional block diagram of a head-mounted display system according to another embodiment of the present disclosure.
Figure 4B:
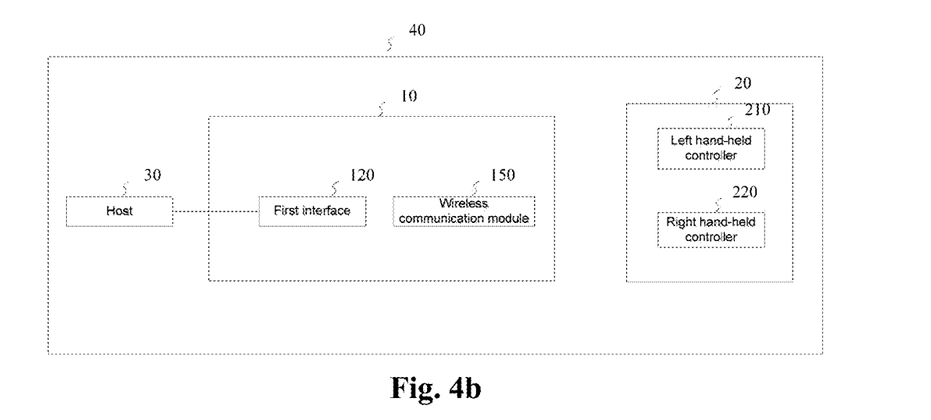
FIG. 4b is a functional block diagram of a head-mounted display system according to another embodiment of the present disclosure.

The embodiment further provides a head-mounted display system 40. As shown in FIG. 4a and FIG. 4b, the head-mounted display system 40 includes the head-mounted display device 10, the hand-held controller 20 and the host 30 provided in any one of the embodiments.

The hand-held controller 20 is in wireless communication connection with the head-mounted display device 10 by means of the wireless communication module 140 of the head-mounted display device 10. The hand-held controller 20 includes a left hand-held controller 210 and a right hand-held controller 220. For example, both the left hand-held controller 210 and the right hand-held controller 220 are provided with wireless communication modules to be in wireless communication with the head-mounted display device 10 by means of the corresponding wireless communication modules.

The hand-held controller 20 includes a second inertial measurement module and a plurality of illumination sources (not shown in the figures). The hand-held controller 20 may further include a power-on/system key, a confirm key, a return key, a menu key, a rocker confirm key, a trigger key, a grab key, a rocker, etc. Moreover, the hand-held controller 20 supports touch functions of the confirm key, the return key, a rocker key and the trigger key, and further has a thumb rest area. Control of the hand-held controller 20 may refer to the embodiments, which will not be limited herein.

The host 30 may be in wire communication connection with the head-mounted display device 10 via the first interface 120. As shown in FIG. 4a, for example, the head-mounted display device 10 may work in the all-in-one machine mode when the host 30 is not connected to the head-mounted display device 10 via the first interface 120. As shown in FIG. 4b, for example, the head-mounted display device 10 may work in the PC helmet mode when the host 30 is connected to the head-mounted display device 10 via the first interface 120.

The present disclosure may be a system, method and/or a computer program product. The computer program product may include a computer-readable storage medium loading computer-readable program instructions allowing the processor to implement various aspects of the present disclosure.

The computer-readable storage medium may be a tangible device that may be used to keep and store instructions used by an instruction execution device. The computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read only memory (ROM), an erasable programmable read only memory (EPROM or flash memory), a static random access memory (SRAM), a portable compact disk read only memory (CD-ROM), a digital versatile disk (DVD), a memory stick, a floppy disk, a mechanical encoding device, a punched card or protrusion-in-groove structure storing instructions, and any suitable combination of the foregoing. The computer-readable storage medium used herein is not to be construed as a transient signal per se, such as a radio wave or other electromagnetic waves freely propagated, an electromagnetic wave (e.g., an optical pulse passing through a fiber optic cable) propagated through a waveguide or other transmission media, or an electrical signal transmitted through an electrical wire.

The computer-readable program instructions described herein may be downloaded from the computer-readable storage medium to various computing/processing devices, or to an external computer or external storage device through a network, such as the Internet, a local area network, a wide area network, and/or a wireless network. The network may include a copper transmission cable, fiber optic transmission, wireless transmission, a router, a firewall, a switch, a gateway computer and/or an edge server. A network adapter card or a network interface in each computing/processing device receives the computer-readable program instructions from the network and transmits the computer-readable program instructions, so as to store the computer-readable program instructions in computer-readable storage media in various computing/processing devices.

The computer program instructions for implementing the operations of the present disclosure may be assembly instructions, instruction set architecture (ISA) instructions, machine instructions, machine-related instructions, microcode, firmware instructions, state setting data, or source code or object code written in any combination of one or more programming languages, where the programming languages include object-oriented programming languages, such as Smalltalk and C++, as well as conventional procedural programming languages such as "C" language or similar programming languages. The computer-readable program instructions may be executed entirely on a user computer, executed partially on the user computer, executed as a stand-alone software package, executed partially on the user computer and partially on a remote computer, or executed entirely on the remote computer or a server. In the case that the remote computer is involved, the remote computer may be connected to the user computer through any kind of network, including the local area network (LAN)

or the wide area network (WAN), or may be connected to the external computer (for example, the remote computer is connected through the Internet by an Internet service provider). In some embodiments, status information of the computer-readable program instructions is used to custom-make an electronic circuit, such as a programmable logic circuit, a field programmable gate array (FPGA), or a programmable logic array (PLA), where the electronic circuit may execute the computer-readable program instructions, so as to implement all the aspects of the present disclosure.

All the aspects of the present disclosure are described with reference to flow diagrams and/or block diagrams of methods, apparatuses (systems), and computer program products in the embodiments of the present disclosure. It should be understood that each block of the flow diagrams and/or block diagrams, and combinations of blocks in the flow diagrams and/or block diagrams may be implemented by the computer-readable program instructions.

These computer-readable program instructions may be provided for a general-purpose computer, a special-purpose computer, or a processor of another programmable data processing apparatus to generate a machine, so that when the instructions are executed by a computer or a processor of another programmable data processing apparatus, an apparatus for implementing a function/action specified in one or more blocks in the flow diagrams and/or block diagrams. These computer-readable program instructions may further be stored in the computer-readable storage medium, and make the computer, the programmable data processing apparatus and/or other devices work in a specific mode, so that the computer-readable medium storing the instructions includes a manufactured article including instructions for implementing various aspects of the functions/actions specified in one or more blocks in the flow diagrams and/or block diagrams.

These computer-readable program instructions may be loaded onto a computer, another programmable data processing apparatus, or other devices, so that a series of operation steps are executed on the computer, another programmable data processing apparatus, or other devices, thereby generating a computer-implemented process. Therefore, the instructions executed on the computer, another programmable data processing apparatus, or other devices implement functions/actions specified in one or more blocks in the flow diagrams and/or block diagrams.

The flow diagrams and block diagrams in the accompanying drawings illustrate system structures, functions and operations, which may be achieved according to systems, methods and computer program products in the various embodiments of the present disclosure. In view of this, each block in the flow diagrams or block diagrams may represent a module, a program segment, or a part of an instruction, which includes one or more executable instructions for implementing specified logical functions. In some alternative implementations, the functions noted in the blocks may also occur in sequences different from those in the accompanying drawings. For example, the functions represented by two continuous blocks may be actually implemented basically in parallel, or may be implemented in reverse sequences, which depends on the involved functions. It should further be noted that each block in the block diagrams and/or flow diagrams, and combinations of the blocks in the block diagrams and/or the flow diagrams may be achieved by using dedicated hardware-based systems that implement the specified functions or actions, or may be achieved by using combinations of dedicated hardware and computer instructions. It is well known to those skilled in the art that the implementation by hardware, software and a combination of software and hardware are all equivalent.

The embodiments of the present disclosure have been described above, and the above description is exemplary, not exhaustive, and not limited to the disclosed embodiments. Without departing from the scope and spirit of the described embodiments, many modifications and changes will be obvious to those of ordinary skill in the art. The selection of terms used herein is intended to best explain the principle, practical application or technical improvement in the market of each embodiment, or to make other persons of ordinary skill in the art understand each embodiment disclosed herein. The scope of the present disclosure is limited by the appended claims.

What is claimed is:

1. A head-mounted display device, comprising a processor, a first interface, a transfer switch, a wireless communication module and a display screen, wherein
the wireless communication module is configured to be in wireless communication connection with a hand-held controller;
the processor is configured to acquire first position data of the head-mounted display device and second position data of the hand-held controller;
the processor is further configured to control the transfer switch to switch for communication between the first interface and the display screen when detecting that the first interface is connected to a host, and send the first position data and the second position data to the host via the first interface, so as to allow the host to render an image according to the first position data and the second position data and to output and display a rendered image on the display screen via the first interface; and
the processor is further configured to control the transfer switch to switch for communication between the processor and the display screen when detecting that the first interface is not connected to the host, and render the image according to the first position data and the second position data and output and display a rendered image on the display screen.

2. The head-mounted display device according to claim 1, further comprising a camera and a first inertial measurement module, wherein the hand-held controller comprises a second inertial measurement module and a plurality of illumination sources, and
the camera device is configured to collect a first image in first exposure time and collect a second image in second exposure time, the second image at least comprising light spots corresponding to the plurality of illumination sources arranged on the hand-held controller;
the first inertial measurement module is configured to collect posture information of the head-mounted display device;
the second inertial measurement module is configured to collect posture information of the hand-held controller; and
the processor is further configured to determine the first position data according to the first image and the posture information of the head-mounted display device, and determine the second position data according to the second image, the posture information of the hand-held controller and the first position data.

3. The head-mounted display device according to claim 2, wherein the camera device comprises at least one fisheye camera.

4. The head-mounted display device according to claim 1, further comprising an audio output module, wherein
the processor is further configured to receive audio data transmitted by the host via the first interface and decode the audio data when detecting that the first interface is connected to the host; and
the audio output module is configured to play decoded audio data.

5. The head-mounted display device according to claim 1, further comprising a bridge chip and a display driving module, wherein the display driving module is connected between the processor and the transfer switch, the bridge chip is connected between the first interface and the transfer switch, and
the bridge chip is configured to convert a received image rendered by the host and output the image to the display screen for display; and
the display driving module is configured to drive the display screen to display an image rendered by the processor.

6. The head-mounted display device according to claim 1, further comprising a lens module, wherein the lens module comprises a left lens and a right lens.

7. The head-mounted display device according to claim 6, wherein the display screen comprises a left display screen and a right display screen, the left display screen moves with movement of the left lens, and the right display screen moves with movement of the right lens.

8. The head-mounted display device according to claim 6, further comprising an interpupillary distance (IPD) measurement module, wherein
the interpupillary distance measurement module is configured to measure a distance between the left lens and the right lens; and
the processor is configured to adjust, a display central position of an image displayed on the display screen according to the distance between the left lens and the right lens when a central position of the lens module is aligned with a human eye central position of a wearer of the head-mounted display device.

9. The head-mounted display device according to claim 1, further comprising a second interface, wherein
the second interface is configured to connect a power supply device to allow the power supply device to supply power to the head-mounted display device.

10. A head-mounted display system, comprising:
the head-mounted display device as claimed in claim 1;
a hand-held controller, the hand-held controller being in wireless communication connection with the head-mounted display device via a wireless communication module of the head-mounted display device; and
a host, the host being in wire communication connection with the head-mounted display device via a first interface of the head-mounted display device.

11. The system according to claim 10, the head-mounted display device further comprises a camera and a first inertial measurement module, and the hand-held controller comprises a second inertial measurement module and a plurality of illumination sources, wherein
the camera device is configured to collect a first image in first exposure time and collect a second image in second exposure time, the second image at least comprising light spots corresponding to the plurality of illumination sources arranged on the hand-held controller;
the first inertial measurement module is configured to collect posture information of the head-mounted display device;
the second inertial measurement module is configured to collect posture information of the hand-held controller; and
the processor is further configured to determine the first position data according to the first image and the posture information of the head-mounted display device, and determine the second position data according to the second image, the posture information of the hand-held controller and the first position data.

12. The system according to claim 11, wherein the camera device comprises at least one fisheye camera.

13. The system according to claim 10, the head-mounted display device further comprises an audio output module, wherein
the processor is further configured to receive audio data transmitted by the host via the first interface and decode the audio data when detecting that the first interface is connected to the host; and
the audio output module is configured to play decoded audio data.

14. The system according to claim 10, the head-mounted display device further comprises a bridge chip and a display driving module, and the display driving module is connected between the processor and the transfer switch, the bridge chip is connected between the first interface and the transfer switch, wherein
the bridge chip is configured to convert a received image rendered by the host and output the image to the display screen for display; and
the display driving module is configured to drive the display screen to display an image rendered by the processor.

15. The system according to claim 10, the head-mounted display device further comprises a lens module, and the lens module comprises a left lens and a right lens.

16. The system according to claim 15, wherein the display screen comprises a left display screen and a right display screen, the left display screen moves with movement of the left lens, and the right display screen moves with movement of the right lens.

17. The system according to claim 15, the head-mounted display device further comprises an interpupillary distance (IPD) measurement module, wherein
the interpupillary distance measurement module is configured to measure a distance between the left lens and the right lens; and
the processor is configured to adjust, a display central position of an image displayed on the display screen according to the distance between the left lens and the right lens when a central position of the lens module is aligned with a human eye central position of a wearer of the head-mounted display device.

18. The system according to claim 10, the head-mounted display device further comprises a second interface, wherein
the second interface is configured to connect a power supply device to allow the power supply device to supply power to the head-mounted display device.

* * * * *